(12) United States Patent
Suzuki

(10) Patent No.: US 11,808,634 B2
(45) Date of Patent: Nov. 7, 2023

(54) TEMPERATURE SENSOR, TEMPERATURE SENSOR ELEMENT, AND METHOD FOR MANUFACTURING TEMPERATURE SENSOR

(71) Applicant: SHIBAURA ELECTRONICS CO., LTD., Saitami (JP)

(72) Inventor: Tatsuyuki Suzuki, Saitama (JP)

(73) Assignee: SHIBAURA ELECTRONICS CO., LTD., Saitami (JP)

( * ) Notice: Subject to any disclaimer, the term of this patent is extended or adjusted under 35 U.S.C. 154(b) by 620 days.

(21) Appl. No.: 16/962,307

(22) PCT Filed: Nov. 15, 2019

(86) PCT No.: PCT/JP2019/044907
§ 371 (c)(1),
(2) Date: Jul. 15, 2020

(87) PCT Pub. No.: WO2021/095244
PCT Pub. Date: May 20, 2021

(65) Prior Publication Data
US 2021/0404882 A1    Dec. 30, 2021

(51) Int. Cl.
*G01K 1/08* (2021.01)
*G01K 1/14* (2021.01)
*G01K 7/22* (2006.01)

(52) U.S. Cl.
CPC .................. *G01K 1/08* (2013.01); *G01K 1/14* (2013.01); *G01K 7/22* (2013.01)

(58) Field of Classification Search
CPC .. G01K 1/08; G01K 1/14; G01K 7/22; G01K 7/16
See application file for complete search history.

(56) References Cited

U.S. PATENT DOCUMENTS

2016/0209276 A1    7/2016 Noli

FOREIGN PATENT DOCUMENTS

CN    109073480 A    12/2018
JP    S52-170577 U    12/1977
(Continued)

OTHER PUBLICATIONS

Office action for CN application No. 201980006790.5 dated Oct. 27, 2020 and translation of the Office action.
(Continued)

*Primary Examiner* — Brandi N Hopkins
*Assistant Examiner* — Janice M Soto
(74) *Attorney, Agent, or Firm* — Pearne & Gordon LLP

(57) ABSTRACT

A temperature sensor comprises: a sensor element including a thermosensitive body and a pair of electric wires that are electrically connected to the thermosensitive body; a protective tube for accommodating the sensor element; and a filling body that lies between the protective tube and the sensor element inside the protective tube. The pair of electric wires includes a pair of first electric wires and that are connected to the thermosensitive body, and a pair of second electric wires and that are connected to the pair of first electric wires and, respectively. The pair of second electric wires and are connected to the pair of first electric wires and on its front side at which insulation coverings thereof are separated from each other.

9 Claims, 7 Drawing Sheets

(56) References Cited

FOREIGN PATENT DOCUMENTS

| | | | |
|---|---|---|---|
| JP | S63-031344 U1 | 2/1988 | |
| JP | H05-075630 U | 10/1993 | |
| JP | 2010123641 A * | 6/2010 | |
| JP | 2016133317 A * | 7/2016 | ............... G01K 7/22 |
| JP | 6360273 B1 * | 7/2018 | ............... B05D 1/18 |
| KR | 20090025680 A * | 3/2009 | |
| KR | 20090025680 A | 3/2009 | |

OTHER PUBLICATIONS

International Search Report for PCT/JP2019/044907 dated Dec. 10, 2019.
Written Opinion for PCT/JP2019/044907 dated Dec. 10, 2019.

\* cited by examiner

TEMPERATURE SENSOR, TEMPERATURE SENSOR ELEMENT, AND METHOD FOR MANUFACTURING TEMPERATURE SENSOR

This is the National Stage of PCT international application PCT/JP2019/044907 filed on Nov. 15, 2019, the content of which is incorporated herein by reference in its entirety.

TECHNICAL FIELD

The present invention relates to a temperature sensor in which an element of the temperature sensor is accommodated inside a protective tube, and a space between the protective tube and the element is filled with a filling body comprising a resin material.

BACKGROUND ART

Conventionally, a temperature sensor has been known which accommodates a sensor element provided with a thermosensitive body inside a protective tube. One end of the protective tube closed and the other end is opened. The protective tube is provided with a filling body comprising a resin material inside the protective tube to hold the sensor element.

This temperature sensor comprises the protective tube of a metal material having a higher thermal conductivity than the filling body in order to rapidly transmit a peripheral temperature to the thermosensitive body. In addition, the filling body inside the protective tube surrounds the sensor element to protect the sensor element from the peripheral atmosphere. The protective tube also protects the sensor element from the peripheral atmosphere.

In a temperature sensor that is used in a wet atmosphere with a large amount of moisture, the moisture can enter into the inside even through a minute clearance. If this moisture reaches between the pair of electric wires which are connected to the thermosensitive body, an electric short circuit is caused.

Patent Literature 1 proposes a temperature sensor that can suppress a short circuit even when being used in the wet atmosphere. The temperature sensor of Patent Literature 1 is provided with a first covering layer and a second covering layer. The first covering layer comprises a first electrical insulator and covers a portion from the thermosensitive body to predetermined positions of a pair of electric wires. The second covering layer comprises a second electrical insulator and covers the first covering layer. In the temperature sensor of Patent Literature 1, the first covering layer is provided with a region in which the first covering layer covers the pair of electric wires, specifically, covers a pair of lead wires connected to the thermosensitive body in a bundle, and a region in which the first covering layer individually covers each of the pair of lead wires.

The temperature sensor of Patent Literature 1 is provided with a region in which the covering layer covers the pair of lead wires in a bundle, and a region in which the covering layer individually covers each of the pair of lead wires. According to the temperature sensor of Patent Literature 1, a creepage distance between the pair of lead wires becomes long, and a short circuit between the pair of lead wires can be suppressed.

CITATION LIST

Patent Literature

Patent Literature 1: JP 6360273 B2

SUMMARY OF INVENTION

Technical Problem

An object of the present invention is to reduce a possibility of a short circuit in a site different from that in Patent Literature 1, by elongating the creepage distance of the site.

Solution to Problem

The temperature sensor of the present invention comprises: a sensor element including a thermosensitive body and a pair of electric wires that are electrically connected to the thermosensitive body; a protective tube for accommodating the sensor element; and a filling body that lies between the protective tube and the sensor element inside the protective tube.

The pair of electric wires comprises a pair of first electric wires that are connected to the thermosensitive body, and a pair of second electric wires that are connected to the pair of first electric wires, respectively.

Insulation coverings of the pair of second electric wires are separated from each other, on the front side at which the pair of second electric wires are connected to the pair of first electric wires.

A distance between the pair of second electric wires in the present invention preferably becomes narrow as the distance becomes apart from the front side, and the pair of second electric wires come in contact with each other at a predetermined position.

The pair of second electric wires in the present invention are preferably drawn out of the protective tube, and come in contact with each other at a predetermined position in drawn-out portions of the pair of second electric wires.

In the inside of the protective tube in the present invention, preferably, the filling body lies between the pair of second electric wires which are separated from each other.

The filling body in the present invention preferably comprises a first covering layer, a second covering layer, and a third covering layer.

The first covering layer comprises a first electrical insulator, and covers a portion from the thermosensitive body to predetermined positions of the pair of first electric wires. The second covering layer comprises a second electrical insulator, and covers the first covering layer. The third covering layer comprises a third electrical insulator, and covers the second covering layer and the pair of second electric wires. The second covering layer lies between the pair of second electric wires that are separated from each other, as a filling body.

The first covering layer in the present invention preferably comprises first regions that cover the pair of first electric wires in a bundle, and second regions that are integrally connected to the first regions and individually cover each of the pair of first electric wires. The second covering layer lies between the pair of first electric wires that are separated from each other, as the filling body.

The present invention also provides a sensor element as a single unit, which is applied to a temperature sensor. The sensor element comprises a thermosensitive body, and a pair of electric wires which are electrically connected to the thermosensitive body. The pair of electric wires comprises a pair of first electric wires which are connected to the thermosensitive body, and a pair of second electric wires which are connected to the pair of first electric wires, respectively. Insulation coverings of the pair of second electric wires are separated from each other, on the front side in which the pair of second electric wires are connected to the pair of first electric wires.

The present invention provides a method for manufacturing a temperature sensor which comprises: a sensor element including a thermosensitive body and a pair of electric wires that are electrically connected to the thermosensitive body; a protective tube for accommodating a portion of the thermosensitive body of the sensor element; and a filling body that lies between the protective tube and the sensor element inside the protective tube. The pair of electric wires in the present invention comprises a pair of first electric wires which are connected to the thermosensitive body, and a pair of second electric wires which are connected to the pair of first electric wires, respectively. The manufacturing method of the present invention comprises a step (A) of connecting the pair of second electric wires to the pair of first electric wires which are connected to the thermosensitive body, on the front side at which the pair of second electric wires are to be connected to the pair of first electric wires, in a state in which the insulation coverings of the pair of second electric wires are separated from each other. After the step (A), the step (B) is performed that lays the filling body between the protective tube and the sensor element, while maintaining the state in which the insulation coverings of the pair of second electric wires are separated from each other.

The step (B) in the present invention preferably includes the following steps (a), (b), and (c).

Step (a): forming the first covering layer that comprises the first electrical insulator and covers a portion from the thermosensitive body to predetermined positions of the pair of first electric wires.

Step (b): forming the second covering layer that comprises the second electrical insulator and covers the first covering layer.

Step (c): forming the third covering layer comprising the third electrical insulator by inserting the sensor element into the inside of the protective tube in which an uncured resin material is accommodated, from a side on which the second covering layer is formed.

In the step (a), the first covering layer is formed in a state in which the restraining member is kept interposed between the pair of second electric wires, the insulation coverings of which are separated from each other.

In the step (b), the second covering layer is formed while avoiding the restraining member which is interposed between the pair of second electric wires.

In the step (c), the third covering layer is formed by inserting the sensor element into the inside of the protective tube, in a state in which the restraining member is removed or the restraining member is kept interposed between the pair of second electric wires.

Advantageous Effect of Invention

In the temperature sensor according to the present invention, the insulation coverings of the pair of second electric wires are separated from each other on the front side, and accordingly the creepage distance between the core wires of the pair of second electric wires can be increased. Accordingly, the temperature sensor of the present invention can suppress a short circuit between the core wires of the pair of second electric wires even when being used in a wet atmosphere.

DESCRIPTION OF EMBODIMENTS

Hereinafter, a temperature sensor 1 according to a preferred embodiment of the present invention and a manufacturing method thereof will be described with reference to the drawings.

Figure 1:
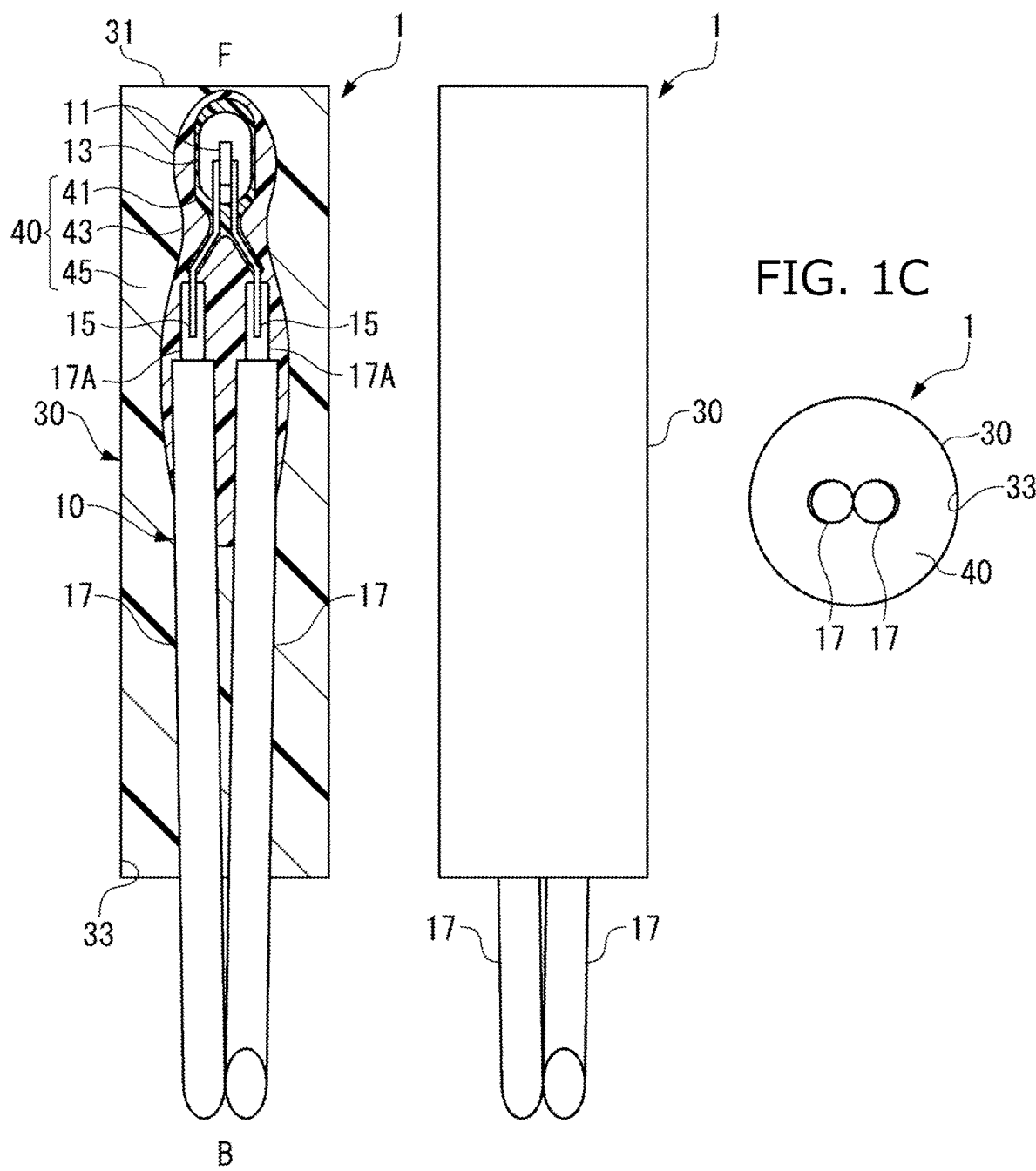
FIG. 1A, FIG. 1B, and FIG. 1C each show a temperature sensor according to one embodiment of the present invention, FIG. 1A being a partial longitudinal sectional view, FIG. 1B being a side view, and FIG. 1C being a front view.

As shown in FIG. 1A, the temperature sensor 1 is provided with a sensor element 10 that serves as a main body of temperature detection, a protective tube 30 which covers a main part of the sensor element 10, and a filling body 40 which lies between the sensor element 10 and the protective tube 30.

In the temperature sensor 1, the creepage distance between the core wires 17A and 17A of the pair of second electric wires 17 and 17 is increased, so that a short circuit between the core wires 17A and 17A can be suppressed even when being used under a wet environment.

In the following, components of the temperature sensor 1 are described, and the manufacturing procedure of the temperature sensor 1 is then described.

<Sensor Element 10>

As illustrated in FIG. 1A, FIG. 1B, FIG. 1C and FIG. 2, the sensor element 10 includes a thermosensitive body 11, a protective layer 13 that is made of glass and covers the surroundings of the thermosensitive body 11, a pair of first electric wires 15 and 15 that are directly electrically connected to the thermosensitive body 11, and the second electric wires 17 and 17 that are respectively electrically connected to the first electric wires 15 and 15. The first electric wires 15 and 15 and the second electric wires 17 and 17 that are electrically connected constitute a pair of electric wires in the present invention.

Note that, in the temperature sensor 1, a side on which the thermosensitive body 11 is provided is defined as a front F, and a side on which the second electric wires 17 is drawn out is defined as a rear B, as illustrated in FIG. 1A. The definitions are relative to each other.

[Thermosensitive Body 11]

As the thermosensitive body 11, for example, a thermistor is preferably used. The thermistor is an abbreviation of a thermally sensitive resistor, and is a metal oxide that uses change of electrical resistance according to temperature, to measure the temperature.

The thermistor is classified into an NTC (negative temperature coefficient) thermistor and a PTC (positive temperature coefficient) thermistor, and any of the thermistors can be used in the present invention.

As the NTC thermistor, an oxide sintered body that includes, as a basic composition, a manganese oxide ($Mn_3O_4$) including a typical spinel structure can be used for the thermosensitive body 11. An oxide sintered body can also be used for the thermosensitive body 11, which has a composition of $M_xMn_{3-x}O_4$ in which an M element (one or more of Ni, Co, Fe, Cu, Al and Cr) is added to the basic structure. Furthermore, one or two or more kinds of V, B, Ba, Bi, Ca, La, Sb, Sr, Ti, and Zr can be added thereto.

In addition, as the PTC thermistor, a composite oxide including a typical perovskite structure, for example, an oxide sintered body which has $YCrO_3$ as a basic composition can be used for the thermosensitive body 11.

[Protective Layer 13]

Figure 2:
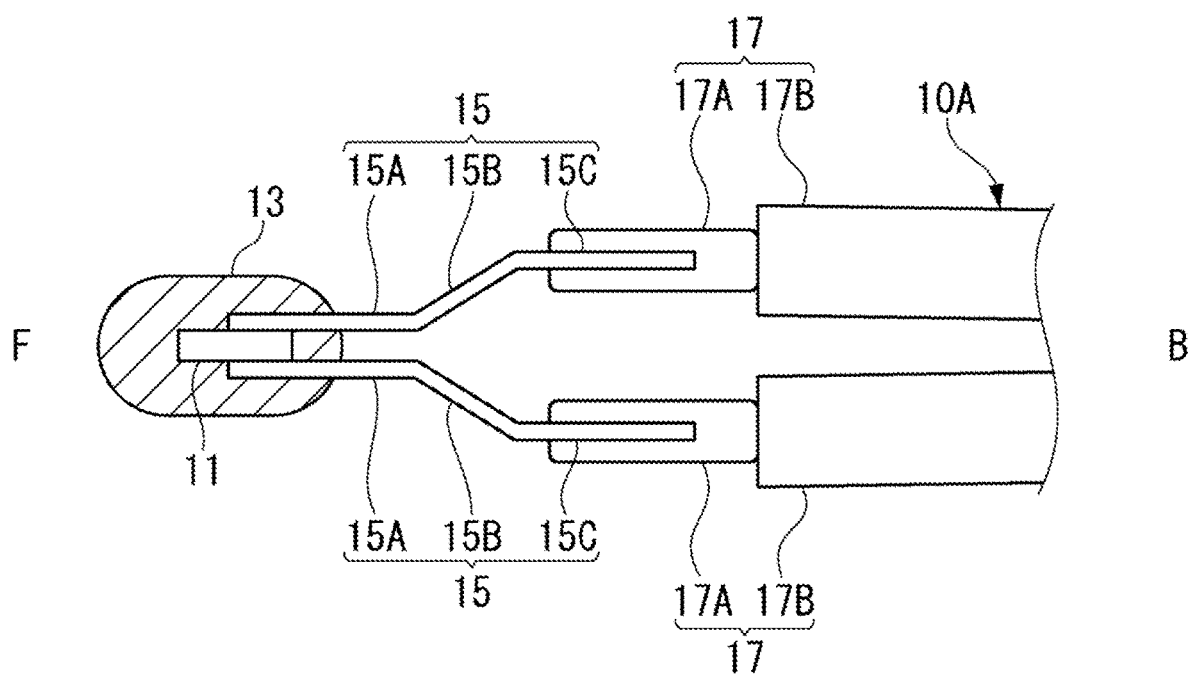
FIG. 2 shows a partial vertical sectional view showing a first intermediate body according to the present embodiment.

As illustrated in FIG. 1A and FIG. 2, the protective layer 13 made of glass seals the thermosensitive body 11 to hold the body in an airtight state, thereby preventing the occurrence of chemical and physical changes of the thermosensitive body 11 based on an environmental condition in which the temperature sensor 1 is used, and mechanically protecting the thermosensitive body 11 as well. The protective layer 13 made of glass covers not only the whole of the thermosensitive body 11 but also the front ends of the respective first electric wires 15 and 15 to seal the first electric wires 15 and 15.

Note that it is only a preferred embodiment in the present invention to provide the protective layer 13 made of glass, and that it is optional to provide the protective layer 13.

[First Electric Wire 15]

As illustrated in FIG. 2, the first electric wires 15 and 15 are electrically connected to electrodes of the thermosensitive body 11, the illustration of which is omitted.

As each of the first electric wires 15 and 15, Dumet wire that has a linear expansion efficient similar to that of glass is used, because the first electric wires 15 and 15 are sealed by the protective layer 13. Note that the Dumet wire is an electric wire in which an alloy mainly containing iron and nickel is used as a core wire which is an electric conductor, and the conductor is covered with copper. The first electric wires 15 and 15 do not include electrical insulation coverings thereon, and the core wires which are the electric conductor are exposed. Therefore, if moisture enters, a short circuit may occur. In the present embodiment, as will be described later, the creepage distance between the first electric wires 15 and 15 is increased.

One example of linear expansion coefficients of the respective components of the temperature sensor 1 is described below.

Linear Expansion Coefficient
Silicone rubber: 2.0 to $4.0\times10^{-4}$ (/° C.)
Epoxy resin: 5.0 to $8.0\times10^{-5}$ (/° C.)
Copper: 16.5 to $16.8\times10^{-6}$ (/° C.)
Dumet wire: 4.5 to $6.0\times10^{-7}$ (/° C.)
Glass: $9.1\times10^{-6}$ (/° C.)

As illustrated in FIG. 2, the first electric wires 15 and 15 include first regions 15A in the front side, which include a narrow distance therebetween, second regions 15B that include a distance expanding continuously, and third regions 15C in the rear side, which includes a wide distance therebetween. The front side of the first region 15A is connected to the thermosensitive body 11, and the rear side is connected to the front side of the second region 15B. The rear side of the second region 15B is connected to the front side of the third region 15C, and the rear side of the third region 15C is connected to each of the second electric wires 17 and 17. The distance between the first electric wires 15 and 15 on the front side of the first region 15A is specified by dimensions of the thermosensitive body 11, and the distance between the first electric wires 15 and 15 on the rear sides of the third regions 15C is specified by a distance between the second electric wires 17 and 17.

In order to adjust the distance between the first regions 15A and the distance between the third regions 15C, the first electric wires 15 and 15 includes the second regions 15B between the first regions 15A and the third regions 15C. In the second regions 15B, the first electric wires 15 and 15 are separated by a considerable distance therebetween.

[Second Electric Wire 17]

As illustrated in FIG. 2, the second electric wires 17 and 17 includes core wires 17A and 17A including conductors, and insulation coverings 17B and 17B that cover the core wires 17A and 17A. The second electric wires 17 and 17 are referred to as twin core parallel lines or simply as parallel lines. The second electric wires 17 and 17 are electrically connected to the first electric wires 15 and 15 in the portions of the core wires 17A and 17A by welding, an electroconductive adhesive or the like, respectively.

Each of the second electric wires 17 is not restricted in linear expansion coefficient unlike the first electric wires 15, and any material can be selected for the second electric wires 17 as long as the material includes predetermined thermal resistance and predetermined durability.

The core wires 17A and 17A of the pair of second electric wires 17 and 17 include portions that are exposed and at which the core wires 17A and 17A are connected to the first electric wires 15 and 15. Therefore, short circuit may occur between the core wires 17A and 17A. In the present embodiment, the core wires 17A and 17A of the second electric wires 17 and 17 are selected as targets to increase creepage distance.

In the pair of second electric wires 17 and 17, usually, the pair of insulation coverings 17B and 17B are integrally formed and are in contact with each other. The insulation coverings 17B and 17B according to the present embodiment, however, are separated from each other on the front side, as illustrated in FIG. 1A and FIG. 2. Accordingly, the distance between the core wires 17A and 17A can be widened as compared with the case where the pair of insulation coverings are in contact with each other. A distance between the core wires 17A and 17A on the front side is wider than a distance between the core wires 17A and 17A on the rear side. Accordingly, the insulation coverings 17B and 17B form a V shape in a planar view, and the distance between the insulation coverings 17B and 17B becomes narrower as being apart from the front side toward the rear side. Accordingly, the insulation coverings 17B and 17B come in contact with each other at a predetermined position from the front side, specifically, at a terminal portion of the V-shape.

In this way, the insulation coverings 17B and 17B have a configuration such that the distance between the insulation coverings 17B and 17B becomes narrower as being apart from the front side toward the rear side. Therefore, the load on the terminal portion of the V-shape is small. In contrast, it is necessary to bend the terminal portion into an L shape in order to have the same distance on the front side through to the terminal portion on the rear side. In this case, the load on this bent portion is large. Therefore, according to the present embodiment, it is possible to reduce the stress which remains in the second electric wires 17 and 17.

Further, the second electric wires 17 and 17 are drawn to the outside from the protective tube 30, as illustrated in FIG. 1A and FIG. 1B, while portions that are separated from each other of the second electric wires 17 and 17 reach the outside of the protective tube 30. In addition, the insulation coverings 17B and 17B come in contact with each other at a predetermined position in drawn-out tip portions of the respective second electric wires 17 and 17. In this manner, when the portions that are separated from each other of the second electric wires 17 and 17 reach the outside of the protective tube 30, it can be visually confirmed that a long creepage distance is secured between the core wires 17A and 17A inside the protective tube 30.

[Protective Tube 30]

Next, as illustrated in FIGS. 1A to 1C, the protective tube 30 accommodates the sensor element 10 inside and covers the front end of the sensor element 10 through to the second electric wires 17 and 17. The protective tube 30 is made of a metal and is preferably made of copper or a copper alloy which has high thermal conductivity. The protective tube 30 is made of a metal material having high thermal conductivity in order to protect the sensor element 10 accommodated inside from the peripheral atmosphere, and to rapidly transfer the temperature of the peripheral atmosphere to the inside as well.

The protective tube 30 is a cylindrical member including one end that is closed as a closed end 31, and the other end that is open as an open end 33. The protective tube 30 has the closed end 31 located on the front side and the open end 33 arranged on the rear side, and supports the sensor element 10 inside the protection tube 30 with the filling body 40.

In FIG. 1A and the like, the wall thickness of the protective tube 30 is drawn thin, but the wall thickness of the protective tube 30 in the present invention is set according to the use environment and the like.

[Filling Body 40]

Figure 5A:
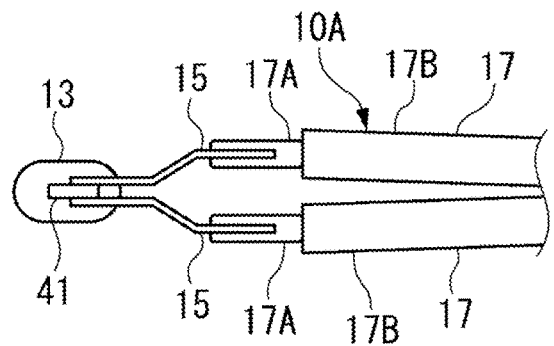
FIG. 5A, FIG. 5B, FIG. 5C, and FIG. 5D each show a view showing a manufacturing procedure of the temperature sensor shown in FIG. 1A, FIG. 1B, FIG. 1C and FIG. 5A showing the first intermediate body, FIG. 5B showing the second intermediate body, FIG. 5C showing the third intermediate body (sensor element), and FIG. 5D showing the temperature sensor.
Figure 5B:
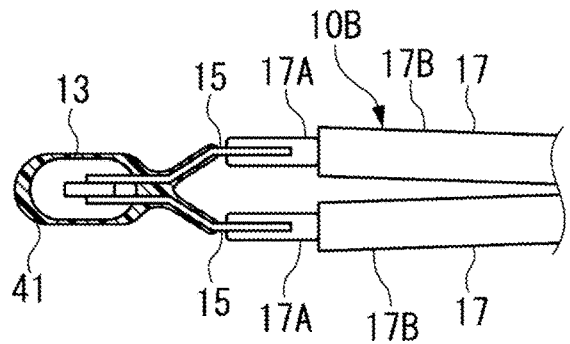
Figure 5C:
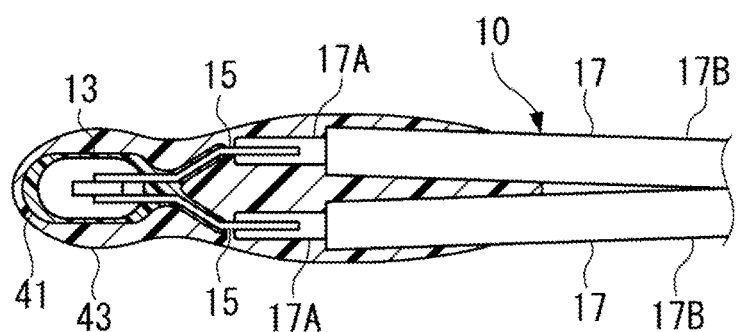
Figure 5D:
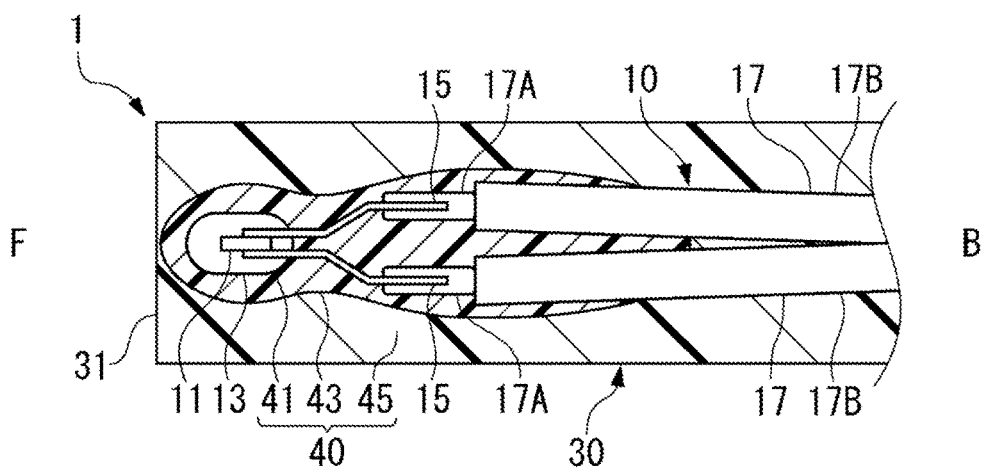

Next, the filling body 40 comprises a first covering layer 41, a second covering layer 43, and a third covering layer 45, as illustrated in FIG. 1A and FIG. 5D.

As a preferred embodiment of the present invention, the first covering layer 41 that directly covers the thermosensitive body 11 comprises a material which deforms more easily than materials for the second covering layer 43 and the third covering layer 45.

Hereinafter, the first covering layer 41, the second covering layer 43, and the third covering layer 45 are sequentially described in a more specific manner.

[First Covering Layer 41]

Figure 3A:
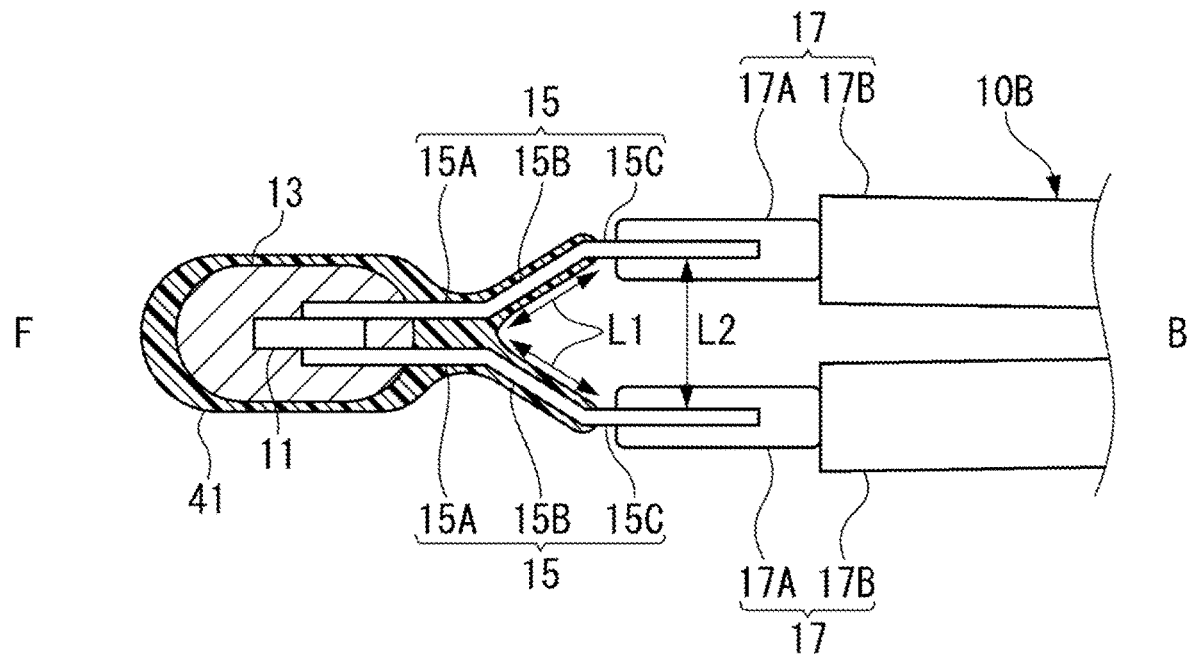
FIG. 3A and FIG. 3B each show a second intermediate body according to the present embodiment, FIG. 3A being a partial longitudinal sectional view, and FIG. 3B being a side view.

As illustrated in FIG. 1A and FIG. 3A, the filling body 40 includes the first covering layer 41 comprising silicone rubber, as a preferable example. The first covering layer 41 functions as an electrical insulator for the protective layer 13 and the first electric wires 15, and ideally comprises a dense film without a hole. The silicone rubber constitutes the first electrical insulator of the present invention. Note that the electrical insulator is simply referred to as an insulator in some cases hereinafter.

The second covering layer 43 comprising an epoxy resin, which is described later, functions as an insulator similarly to the first covering layer 41. Even so, the first covering layer 41 comprising the silicone rubber is provided, because the silicone rubber has a small tensile modulus of elasticity and high elasticity. Specifically, the tensile moduli of elasticity of the silicone rubber and the epoxy resin are shown in comparison in the following. The silicone rubber has a significantly lower elastic modulus than the epoxy resin, and easily deforms even with a small load.

Tensile Modulus of Elasticity
Silicone rubber: 0.01 to 20 (N/mm$^2$)
Epoxy resin: 2000 to 5000 (N/mm$^2$)

When the temperature sensor 1 is used under an environment in which temperature difference occurs, the elements constituting the temperature sensor 1, for example, the first electric wires 15 and 15 and the first covering layer 41 that covers the first electric wires 15 and 15 repeat expansion and contraction. Because the linear expansion coefficients of the first electric wires 15 and 15 and the first covering layer 41 are considerably different from each other, when the expansion and contraction are repeated in a considerable temperature difference, peeling may occur between the first electric wires 15 and 15 and the first covering layer 41. The silicone rubber constituting the first covering layer 41, however, has a small elastic modulus as described below, and thus can deform easily when a load is applied thereto, and absorb the expansion and contraction.

In this way, the first covering layer 41 comprising the silicone rubber functions as the insulator, and also serves as a cushioning function of preventing peeling between the first electric wires 15 and 15 and the first covering layer 41 due to thermal stress accompanying rise and fall of temperature.

This cushioning function, however, is not always required when the degrees of the rise and fall of the temperature are small, and the covering layer comprising the silicone rubber is only a preferred form in the present invention.

Figure 3B:
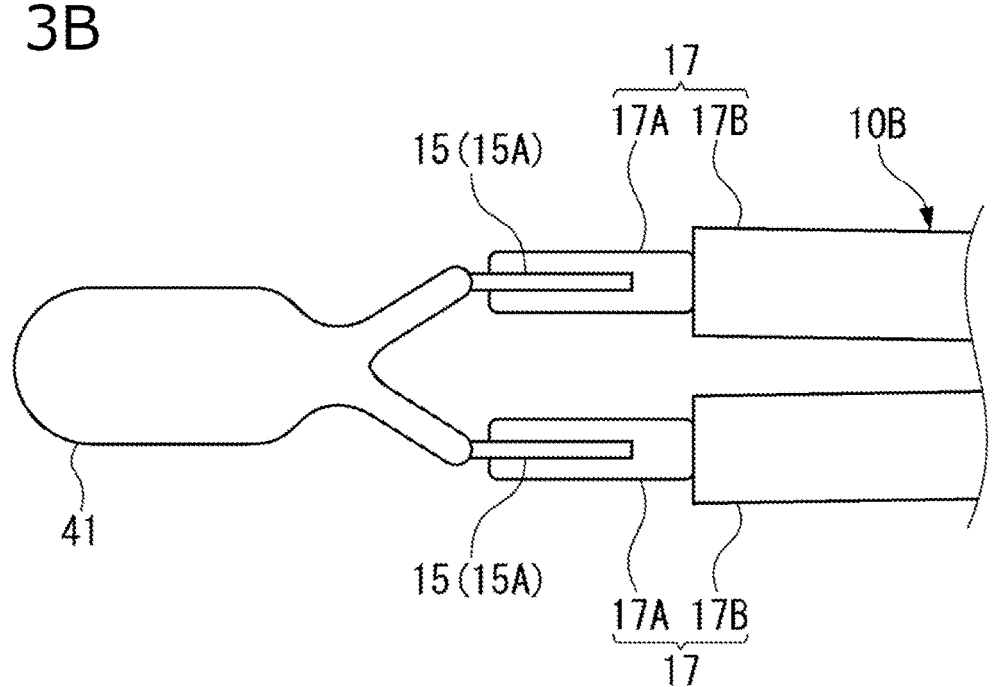

As illustrated in FIG. 3A and FIG. 3B, the first covering layer 41 covers a region from the front end of the protective layer 13 to a predetermined positions of the first electric wires 15, and the whole of the thermosensitive body 11 and the protective layer 13 is covered with the first covering layer 41. The first covering layer 41 has a feature in a configuration of a portion which covers the first electric wires 15. Specifically, the first covering layer 41 covers the first regions 15A and the second regions 15B of the first electric wires 15. Further, the first covering layer 41 collectively covers the two first electric wires 15 and 15 in a bundle in the first regions 15A, but in the second regions 15B, the first covering layer 41 individually covers each of the first electric wires 15. In this way, the first covering layer 41 forms a substantially V shape in a space between the pair of first electric wires 15 and 15, and the creepage distance between the pair of first electric wires 15 and 15 can be increased. The configuration in which the first covering layer 41 covers the first electric wires 15 is a preferred configuration for the present invention.

In other words, in the temperature sensor 1, the first covering layer 41 does not exist between the first electric wires 15 and 15 in the second regions 15B and 15B in which each of the regions is individually covered with the first covering layer 41. Accordingly, the creepage distance in the third regions 15C and 15C of the first electric wires 15 and 15 is 2×L1 as illustrated in FIG. 3A. In contrast, if the first covering layer 41 is formed so as to fill the space between the first electric wires 15 and 15 in the second regions 15B and 15B, the creepage distance is a distance L2 between the first electric wires 15 and 15 in the third regions 15C and 15C, as illustrated in FIG. 3A.

When 2×L1 and L2 are compared, it can be easily understood that the creepage distance can be considerably increased by individually covering each of the first electric wires 15 and 15. Accordingly, the temperature sensor 1 can suppress a short circuit occurring between the first electric wires 15 and 15, even if moisture has entered into the region.

The thickness of the first covering layer 41 is optional as long as the thickness achieves the intended purpose, but as one guideline, when the layer has a thickness of 0.1 mm or larger, the function of the insulator can be achieved.

[Second Covering Layer 43]

Figure 4A:
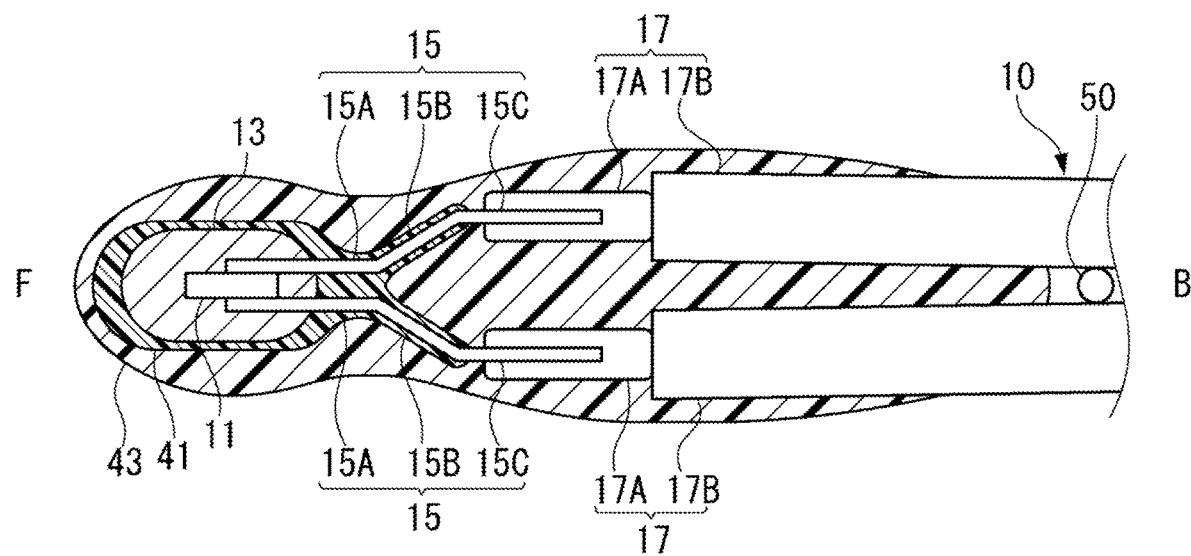
FIG. 4A and FIG. 4B each show a third intermediate body (sensor element) according to the present embodiment, FIG. 4A being a partial vertical sectional view, and FIG. 4B being a side view.
Figure 4B:
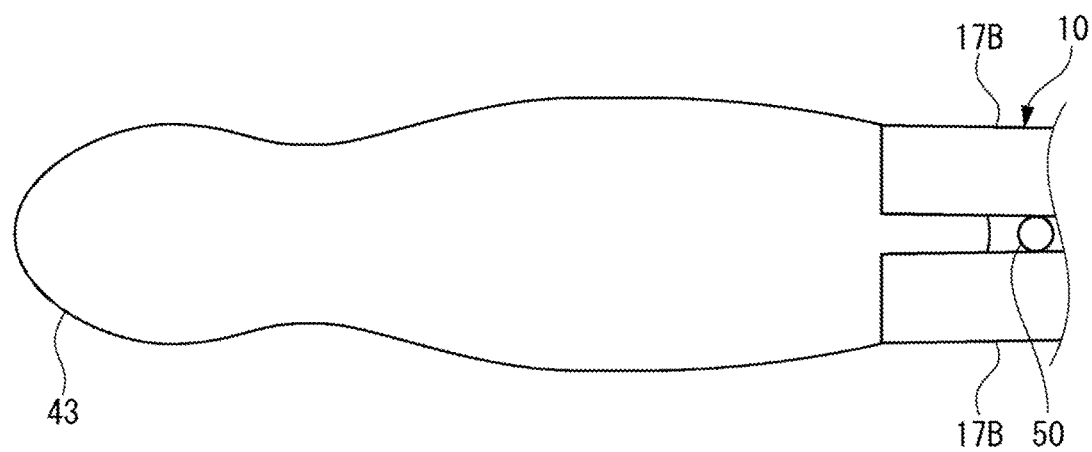

Next, as illustrated in FIG. 1A and FIGS. 4A and 4B, the filling body 40 includes the second covering layer 43 comprising an epoxy resin, as a preferable example. The second covering layer 43 also services as an insulator for the protective layer 13, the first electric wires 15, and the second electric wires 17, similarly to the first covering layer 41. In addition, the second covering layer 43 serves as a joining layer for adhesion to the third covering layer 45 comprising an epoxy resin. The epoxy resin constituting the second covering layer 43 constitutes the second electrical insulator of the present invention.

The second covering layer 43 covers a region from the front end of the first covering layer 41 to a predetermined position of the insulation coverings 17B and 17B of the second electric wires 17 and 17, and the whole of the first covering layer 41 is covered with the second covering layer 43.

The second covering layer 43 is formed through dipping and curing treatment, as is described later. At the time of the dipping, the liquid epoxy resin enters into a space between the first electric wires 15 and 15, and also into a space between the second electric wires 17 and 17. Thus, the second covering layer 43 after the curing treatment lies between the first electric wires 15 and 15 which are separated from each other, and between the insulation coverings 17B and 17B of the second electric wires 17 and 17, which are separated from each other, as illustrated in FIG. 1A and FIG. 4A. As a result, the second covering layer 43 shows an effect of maintaining the distance between the first electric wires 15 and 15 that are separated from each other, and the distance between the insulation coverings 17B and 17B that are separated from each other.

In FIG. 1A, the second covering layer 43 lies between the insulation coverings 17B and 17B of the second electric wires 17 and 17 inside of the protective tube 30, but can also lie between the insulation coverings 17B and 17B in a portion of the second electric wires 17 and 17 drawn to the outside of the protective tube 30.

In the present embodiment, an adhesive force between the silicone rubber constituting the first covering layer 41 and the epoxy resin constituting the second covering layer 43 is weak. If the first covering layer 41 is brought into direct contact with the third covering layer 45 without providing the second covering layer 43 therebetween, an entry path for moisture tends to be easily formed between the first covering layer 41 and the third covering layer 45, because the adhesive force between both of the covering layers is insufficient. On the other hand, by providing the second covering layer 43, an effect of preventing the formation of the entry path for moisture can be expected.

Specifically, the entry path for moisture is not easily formed between the first covering layer 41 and the second covering layer 43, even if the adhesive force between the silicone rubber and the epoxy resin is weak, because the second covering layer 43 covers and seals the whole of the first covering layer 41. On the other hand, the adhesive force between the epoxy resins is strong, accordingly, the second covering layer 43 and the third covering layer 45 are strongly bonded to each other, and the entry path for moisture is not easily formed between the second covering layer 43 and the third covering layer 45.

In addition, a linear expansion coefficient of the silicone rubber which constitutes the first covering layer 41 is one order larger than that of the epoxy resin, as described previously. If the first covering layer 41, and in addition, the second covering layer 43 and the third covering layer 45 also comprise silicone rubber, a thermal stress applied to the thermosensitive body 11 and the protective tube 30 increases due to the expansion and contraction inside the protective tube 30. Thus, the second covering layer 43 and the third covering layer 45 comprise the epoxy resin having a linear expansion coefficient smaller than that of the silicone rubber, and as a result can reduce the thermal stress which is applied to the protective tube 30.

Meanwhile, suppose that the first covering layer 41 comprises an epoxy resin having large elastic modulus. The epoxy resin shows a smaller difference in the linear expansion coefficient from Dumet wire than the silicone rubber, but the epoxy resin has considerably larger elastic modulus than the silicone rubber. Accordingly, depending on the degrees of the rise and fall of temperature, peeling tends to easily occur between the first covering layer 41 and the first electric wires 15 and 15 due to the expansion and contraction.

The thickness of the second covering layer 43 is optional as long as the thickness achieves the intended purpose, but as one guideline, when the layer has a thickness of 0.3 mm or larger, the function of the insulator can be achieved.

[Third Covering Layer 45]

As illustrated in FIG. 1A, the third covering layer 45 covers the sensor element 10, the first covering layer 41 and the second covering layer 43, and also fills the space between the components and the inner peripheral surface of the protective tube 30.

As a preferable example, the third covering layer 45 comprises the epoxy resin similarly to the second covering layer 43, secures an adhesive force between itself and the second covering layer 43, and at the same time secures the adhesive force between itself and the inner wall of the protective tube 30. Thus, the entry path for moisture is not easily formed inside the protective tube 30. The epoxy resin constituting the third covering layer 45 constitutes the third electrical insulator of the present invention.

An epoxy resin is used for both the third covering layer 45 and the second covering layer 43. It is preferable, however, that the third covering layer 45 comprises a material having a higher thermal conductivity than that of the second covering layer 43, in view of a main purpose of the third covering layer 45 that the third covering 42 conducts heat of a peripheral temperature toward the thermosensitive body 11. On the other hand, it is preferable that the second covering layer 43 comprises a material with which the dipping, described later, can be performed soundly.

In the present embodiment, an example of the filling body 40 has been described that comprises the three layers of the first covering layer 41, the second covering layer 43, and the third covering layer 45. The filling body in the present invention, however, is not limited to this. The filling body 40 may comprise only one layer, or the filling body 40 may comprise two layers or four or more layers, depending on a rising and falling temperature, atmosphere and the like. In addition, in the present invention, the filling body 40 may comprise an electrical insulator other than the silicone rubber and the epoxy resin.

<Method for Manufacturing Temperature Sensor 1>

Next, a procedure for manufacturing the temperature sensor 1 is described with reference to FIG. 2 to FIG. 5D.

[First Intermediate Body]

First, as shown in FIG. 2 and FIG. 5A, a first intermediate body 10A that does not include the first covering layer 41 and the second covering layer 43 is prepared. In the first intermediate body 10A, the first electric wires 15 and 15 are connected to a pair of electrodes (not shown) which are respectively provided on top and bottom surfaces of the thermosensitive body 11. In FIG. 2 and FIG. 5A, the first electric wires 15 and 15 are already connected to the pair of second electric wires 17 and 17, respectively, but the insulation coverings 17B and 17B are separated on the front side of the pair of second electric wires 17 and 17. The protective layer 13 can be formed by heating, melting and solidifying a glass pipe in a state that the thermosensitive body 11 with the first electric wires 15 and the like connected thereto is arranged so as to penetrate the inside of the glass pipe.

As well known, the pair of second electric wires 17 and 17 are manufactured integrally with the insulation coverings 17B and 17B. In the present embodiment, before the pair of second electric wires 17 and 17 are connected to the first electric wires 15 and 15, portions corresponding to the front side of the insulation coverings 17B and 17B are cut, so that the pair of second electric wires 17 and 17 can be separated on the front side. Then, the first electric wires 15 and 15 are electrically connected to the core wires 17A and 17A of the second electric wires 17 and 17, and subsequently the distance between the insulation coverings 17B and 17B on the front side is widened to separate the second electric wires 17 and 17 the front side into a V shape.

[Second Intermediate Body]

Next, as illustrated in FIG. 3A and FIG. 5B, the first covering layer 41 is formed on the first intermediate body 10A to obtain the second intermediate body 10B.

The first covering layer 41 is formed by dipping a side of the thermosensitive body 11 (protective layer 13) in liquid silicone rubber. At this time, it is preferable to consider that the portions which cover the first electric wires 15 and 15 individually cover the first electric wires 15 and 15, respectively. The first covering layer 41 which individually covers each of the first electric wires 15 and 15 can be formed, for example, by performing predetermined control when the sensor element 10 is immersed in the liquid silicone rubber and is then pulled up.

The dipping is one of the coating methods of immersing the thermosensitive body 11 and the protective layer 13 which are the objects to be covered, into a liquid covering material, here a liquid silicone rubber.

During the dipping, the insulation coverings 17B and 17B can be mechanically restrained in order to maintain a distance between the insulation coverings 17B and 17B. The maintenance of the distance by the mechanical restraint can be performed in a process for obtaining the second intermediate body 10B, but can also be performed in a process for obtaining the sensor element 10 which is the next third intermediate body. Specific examples of the mechanical restraint will be described in the next paragraph of the third intermediate body.

[Third Intermediate Body]

Next, as shown in FIG. 4A, FIG. 4B and FIG. 5C, the second covering layer 43 is formed on the second intermediate body to obtain the sensor element 10 that is the third intermediate body.

The second covering layer 43 can be formed by dipping a side of the thermosensitive body 11 (protective layer 13) on which the first covering layer 41 has been formed, into a liquid epoxy resin in the same manner as in the first covering layer 41.

At the time of the dipping, it is preferable to mechanically restrain the portion at which the insulation coverings 17B and 17B are separated in order to maintain the state in which the insulation coverings 17B and 17B are separated at a portion on the front side thereof. In order to mechanically restrain the separated portion, as illustrated in FIG. 4A, a pin-shaped restraining member 50 can be interposed between the insulation coverings 17B and 17B which are separated from each other. In order that the restraining member 50 is not immersed in the liquid epoxy resin, the dipping is performed in such a manner that the site at which the restraining member 50 is provided protrudes above the surface of the liquid epoxy resin to avoid the liquid epoxy resin. Accordingly, the second covering layer 43 lies between the insulation coverings 17B and 17B which are separated from each other, but there is a clearance in a place at least from a position at which the restraining member 50 is provided, to the terminal of the V-shape.

In order to cure the epoxy resin to be used for dipping, such curing treatment is performed as to keep the epoxy resin at a temperature, for example, in a temperature range of 100 to 150° C., for a predetermined time period. The restraining member 50 is interposed between the insulation coverings 17B and 17B until the curing treatment is finished. After that, the restraining member 50 may be removed from the space between the insulation coverings 17B and 17B, before the third intermediate body, in other words, the sensor element 10 is sealed in the protective tube 30, or the sensor element 10 may be sealed in the protective tube 30 with the restraining member kept interposed between the insulation coverings 17B and 17B.

The curing treatment is similarly applied also in the step of producing the second intermediate body 10B.

The pin-shaped restraining member 50 is only one example of mechanically restraining means. In the present invention, the separated state may be maintained by another means, for example, by sandwiching a portion at which the insulation coverings 17B and 17B are separated, by a clip from the top and bottom surfaces. Further, the separated state of the insulation coverings 17B and 17B on the front end may be also maintained by bridging and sticking an adhesive tape having high rigidity on the portions of the separated insulation coverings 17B and 17B.

[Sealing in Protective Tube 30]

Next, the sensor element 10 on which the covering layers up to the second covering layer 43 are formed is sealed in the protective tube 30. Sealing is performed according to the following procedure.

A predetermined amount of liquid, specifically, of an epoxy resin in an uncured state is charged into the inside of the protective tube 30 in such a state that the open end 33 thereof faces upward. The epoxy resin constitutes the third covering layer 45 after the curing treatment. The sensor element 10 is inserted from the front end, into the inside of the protective tube 30 in which the epoxy resin has been charged.

The epoxy resin is subjected to the curing treatment after the sensor element 10 has been inserted, and then the temperature sensor 1 is completed.

As illustrated in FIG. 1A, in the inside of the protective tube 30, the second covering layer 43 and the third covering layer 45 lie between the insulation coverings 17B and 17B which are separated from each other. The rear sides of the insulation coverings 17B and 17B which are separated from each other are exposed to the outside of the protective tube 30. In the exposed portions of the insulation coverings 17B and 17B, the space between the insulation coverings 17B and 17B remains in such a state that a clearance is formed. However, if the distance between the insulation coverings 17B and 17B is narrow and the restraining member 50 is not interposed therebetween, the epoxy resin may enter into the clearance between the insulation coverings 17B and 17B in the process of forming the third covering layer 45 due to capillary action.

If the restraining member 50 is kept interposed between the insulation coverings 17B and 17B, the sensor element 10 is sealed in the protective tube 30 in such a manner that the site at which the restraining member 50 is provided is set above the open end 33 of the protective tube 30.

[Effect of Temperature Sensor 1]

The effect of the above described temperature sensor 1 is described.

Figure 6A:
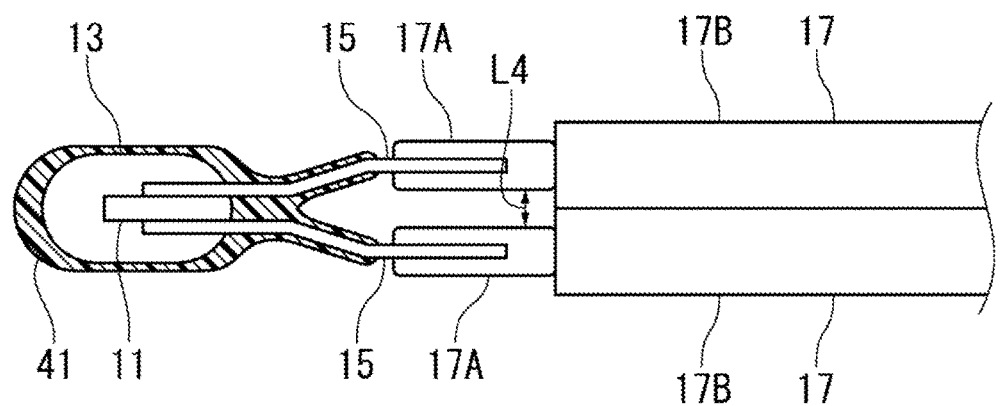
FIG. 6A and FIG. 6B each show a view illustrating a creepage distance in the present embodiment.
Figure 6B:
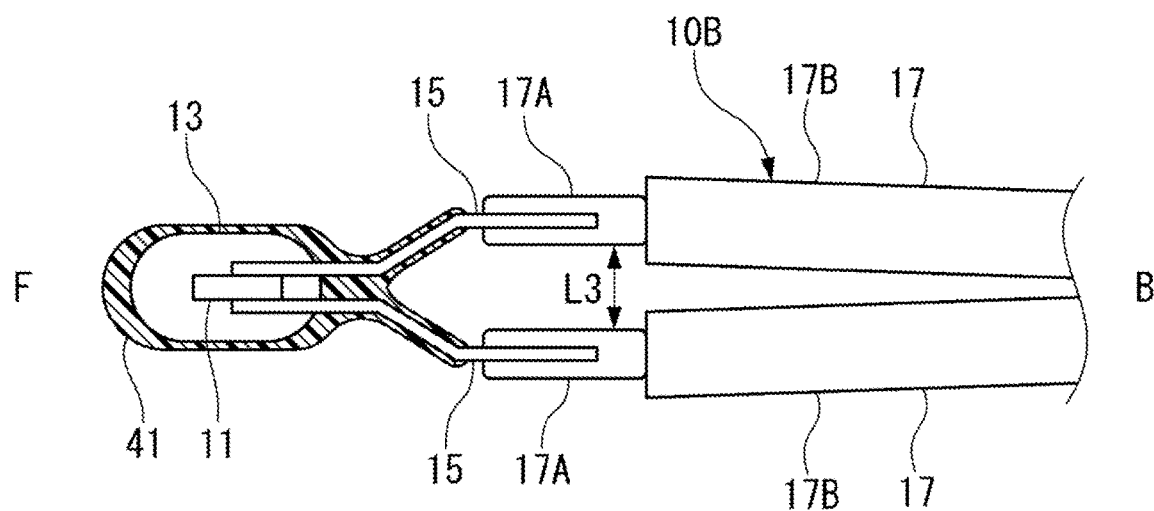

In the temperature sensor 1 according to the present embodiment, as illustrated in FIG. 6B, the insulation coverings 17B and 17B of the second electric wires 17 and 17 are separated on the front side. Therefore, the creepage distance L3 between the core wires 17A and 17A in the present embodiment is larger than the creepage distance L4 in the case of FIG. 6A in which the insulation coverings 17B and 17B are in contact with each other on the front side. Accordingly, the temperature sensor 1 can suppress a short circuit between the pair of core wires 17A and 17A.

In the above, the preferred embodiment of the present invention has been described, but the configuration described in the above embodiment can be selected or replaced with another configuration, insofar as it does not deviate from the scope of the present invention.

Figure 7A:
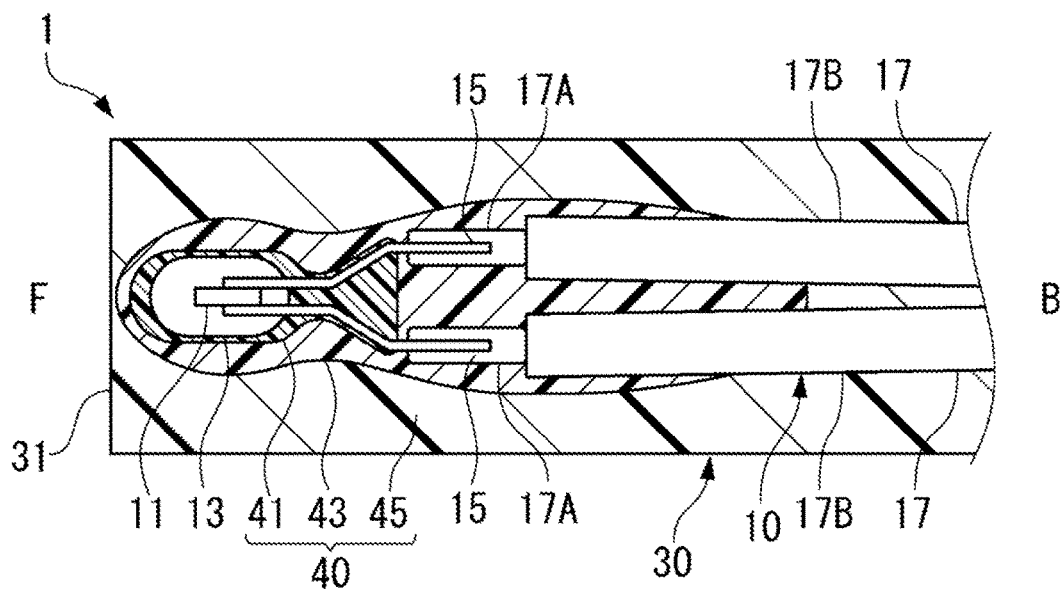
FIG. 7A and FIG. 7B each show a view showing a modified example of the present embodiment.

The temperature sensor 1 is shown as an example of a preferable embodiment in which the first covering layer 41 is not laid between the first electric wires 15 and 15 in the second regions 15B and 15B. However, in the present invention, as shown in FIG. 7A, the first covering layer 41 may be laid between the first electric wires 15 and 15 in the second regions 15B and 15B.

In the present embodiment, silicone rubber is used for the preferred first covering layer 41; however, the present invention is not limited thereto. For example, butadiene rubber may be used. The resin material is common with the silicone rubber in electrical insulating properties and water resistance, and in mechanical characteristics of small elastic modules.

Further, in the present embodiment, the epoxy resin is used for the preferable second covering layer 43 and the third covering layer 45; however, the present invention is not limited thereto. For example, in the present invention, a resin material including physical and chemical characteristics equivalent to those of the epoxy resin may be used.

Figure 7B:
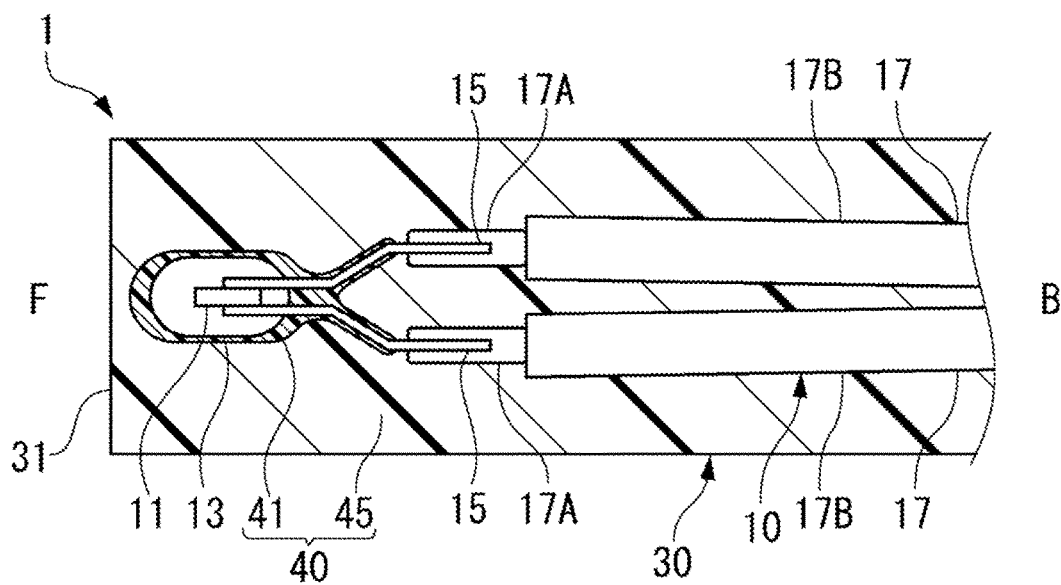

Further, in the present embodiment, the preferable filling body 40 is assumed to have three layers of the first covering layer 41, the second covering layer 43, and the third covering layer 45; however, the present invention is not limited thereto. The filling body 40 may comprise one layer, depending on an environment in which the temperature sensor is used. As illustrated in FIG. 7B, it is also possible to integrate the second covering layer 43 and the third covering layer 45 into one layer, and to refer the layer as the third covering layer 45. In this case, the materials of the first covering layer 41 and the third covering layer 45 are selected in consideration of mutual adhesiveness.

Furthermore, the example of the thermistor as the thermosensitive body has been described in the present embodiment; however, the present invention is not limited thereto. For example, an electric resistor using platinum can be used for the thermosensitive body.

Further, the pair of first electric wires 15 and 15 are formed into the V shape in which the distance between the first electric wires 15 and 15 becomes wider from the front side to the rear side; but the present invention is not limited thereto. The invention broadly includes configurations in which the mutual distance becomes wide, for example, such as a U shape. Similarly, the second electric wires 17 and 17 are formed in the V shape in which the distance becomes narrower from the front side toward the rear side; however, the present invention is not limited thereto. The present invention broadly includes configurations in which the mutual distance becomes narrow, for example, such as a U shape.

REFERENCE SIGNS LIST 1 temperature sensor
10 sensor element
11 thermosensitive body
13 protective layer
15 first electric wire
15A first region
15B second region
15C third region
17 second electric wire
17A core wire
17B insulation covering
30 protective tube
31 closed end
33 open end
40 filling body
41 first covering layer
43 second covering layer
45 third covering layer

The invention claimed is:

1. A temperature sensor comprising:
a sensor element including a thermosensitive body and a pair of first electric wires that are electrically connected to the thermosensitive body;
a protective tube for accommodating the sensor element;
a filling body that lies between the protective tube and the sensor element inside the protective tube; and
a pair of second electric wires that are connected to the pair of first electric wires, respectively, the pair of second electric wires comprising insulation coverings that integrally cover core wires of the second electric wires, respectively, wherein:
the pair of first electric wires comprise first regions, second regions, and third regions,
the filling body comprises a first covering layer, the first covering layer covering the first regions of the pair of first electric wires in a bundle and covering the second regions individually, and
the second electric wires are separated from each other inside of the protective tube and a distance between the second electric wires is decreased continuously inside of the protective tube while the insulation coverings are in contact with each other outside of the protective tube.

2. The temperature sensor according to claim 1, wherein a distance between the pair of second electric wires becomes narrow as the distance becomes apart from the front side, and the pair of second electric wires come in contact with each other at a predetermined position.

3. The temperature sensor according to claim 1, wherein the pair of second electric wires are drawn to the outside of the protective tube, and come in contact with each other at a predetermined position in drawn-out portions of the pair of second electric wires.

4. The temperature sensor according to claim 1, wherein in the inside of the protective tube, the filling body lies between the pair of second electric wires that are separated from each other.

5. The temperature sensor according to claim 4, wherein the filling body comprises:
 the first covering layer that comprises a first electrical insulator and covers a portion from the thermosensitive body to predetermined positions of the pair of first electric wires;
 a second covering layer that comprises a second electrical insulator and covers the first covering layer; and
 a third covering layer that comprises a third electrical insulator and covers the second covering layer and the pair of second electric wires, wherein
 the second covering layer lies between the pair of second electric wires that are separated from each other, as the filling body.

6. The temperature sensor according to claim 5, wherein the first covering layer covers the pair of first electric wires in the bundle in the first regions, and is integrally connected to the first regions and individually cover each of the pair of first electric wires in the second regions, wherein
 the second covering layer lies between the pair of first electric wires that are separated from each other and between the pair of second electric wires that are separated from each other, as the filling body.

7. The temperature sensor according to claim 1, wherein:
 the first regions are formed substantially parallel to each other and connected to the thermosensitive body at first end sides thereof, the second regions are connected to second end sides of the first regions and a distance between the second regions continuously increased, the third regions are formed substantially parallel to each other and connected to third end sides of the second regions at ends thereof and connected to second ends of the core wires of the second electric wires at the third end side thereof, and
 a connection portion between the pair of first electric wires and the pair of the second electric wires is accommodated inside of the protective tube.

8. The temperature sensor according to claim 1, wherein the pair of second electric wires are drawn to the outside of the protective tube, thus forming drawn-out portions of the pair of second electric wires, and the insulation coverings of the pair of second electric wires come in contact with each other at a predetermined position in the drawn-out portions of the pair of second electric wires outside of the protective tube such that portions of the insulation coverings that are separated from each other reach the outside of the protective tube.

9. A method for manufacturing a temperature sensor that comprises: a sensor element including a thermosensitive body and a pair of electric wires that are electrically connected to the thermosensitive body; a protective tube for accommodating a portion of the thermosensitive body of the sensor element; and a filling body that lies between the protective tube and the sensor element inside the protective tube, where
 the pair of electric wires comprises a pair of first electric wires that are connected to the thermosensitive body, and a pair of second electric wires that are connected to the pair of first electric wires, respectively, wherein
 the method comprises: a step (A) of connecting the pair of second electric wires to the pair of first electric wires that are connected to the thermosensitive body, on a front side at which the pair of second electric wires are to be connected to the pair of first electric wires, in a state in which insulation coverings of the pair of second electric wires are separated from each other; and
 a step (B) of laying the filling body between the protective tube and the sensor element, while maintaining the state in which the insulation coverings of the pair of second electric wires are separated from each other, wherein the step (B) comprises:
 a step (a) of forming a first covering layer that comprises a first electrical insulator and covers a portion from the thermosensitive body to predetermined positions of the pair of first electric wires;
 a step (b) of forming a second covering layer that comprises a second electrical insulator and covers the first covering layer; and
 a step (c) of forming a third covering layer comprising a third electrical insulator by inserting the sensor element into the inside of the protective tube in which an uncured resin material is accommodated, from a side on which the second covering layer is formed, wherein
 in the step (a), the first covering layer is formed in a state in which a restraining member is kept interposed between the pair of second electric wires, the insulation coverings of which are separated from each other;
 in the step (b), the second covering layer is formed while avoiding the restraining member interposed between the pair of second electric wires, and
 in the step (c), the third covering layer is formed by inserting the sensor element into the inside of the protective tube, in a state in which the restraining member is removed or the restraining member is kept interposed between the pair of second electric wires.

* * * * *